United States Patent [19]

Kuehn

[11] Patent Number: 4,999,566

[45] Date of Patent: Mar. 12, 1991

[54] CURRENT CONVERTER COMPRISING CURRENT RESPONSIVE, SELF OSCILLATING, SWITCHING REGULATOR

[75] Inventor: Willi Kuehn, Markgroeningen, Fed. Rep. of Germany

[73] Assignee: Robert Bosch GmbH, Stuttgart, Fed. Rep. of Germany

[21] Appl. No.: 446,653

[22] Filed: Dec. 6, 1989

[30] Foreign Application Priority Data

Jun. 29, 1989 [DE] Fed. Rep. of Germany ....... 3921251
Jul. 27, 1989 [DE] Fed. Rep. of Germany ....... 3924805

[51] Int. Cl.⁵ .......................................... H02M 3/156
[52] U.S. Cl. ........................................ 323/222; 363/19
[58] Field of Search ........................... 323/222; 363/19

[56] References Cited

U.S. PATENT DOCUMENTS

| | | | |
|---|---|---|---|
| 3,974,439 | 8/1976 | Holland | 323/222 |
| 4,514,679 | 4/1985 | Schierjott | 323/222 |
| 4,546,304 | 10/1985 | Schwarz | 323/222 |
| 4,642,550 | 2/1987 | Illuzzi et al. | 323/222 |
| 4,654,771 | 3/1987 | Stasch | 363/19 |

FOREIGN PATENT DOCUMENTS 2352828 4/1975 Fed. Rep. of Germany ...... 323/222
3622990 1/1988 Fed. Rep. of Germany .

*Primary Examiner*—William H. Beha, Jr.
*Attorney, Agent, or Firm*—Kenyon & Kenyon

[57] ABSTRACT

A DC voltage transformer with an inductance fed by a primary voltage and an oscillator stage switching the inductance for the generation of a secondary voltage. For reliable operation it is provided that the oscillating current flowing through the inductance is detected and automatically limited by the oscillator stage to a presettable value.

4 Claims, 2 Drawing Sheets

CURRENT CONVERTER COMPRISING CURRENT RESPONSIVE, SELF OSCILLATING, SWITCHING REGULATOR

BACKGROUND OF THE INVENTION

The present invention relates to a DC voltage transformer with an inductance fed by a primary voltage and an oscillator stage switching the inductance for the generation of a secondary voltage.

Voltage transformers of the initially stated type can be used for a variety of tasks. For passenger protection devices in vehicles, DC voltage transformers are required in the event that the operating voltage (onboard supply system voltage) falls below a permissible limit value so that the operation of the passenger protection device is questionable. For the primer of an airbag to function properly, a given minimum voltage must be available so that firing delays or failures are avoided. If, for reasons not further discussed here, a reduction of the operating voltage of the motor vehicle occurs, the initially cited DC voltage transformer can be used to generate from the lower operation voltage a higher supply voltage for application to the primer in the event of the need to release the passenger protection device.

Further discussion regarding these problems can be found in German Patent No. 35 06 487.

In U.S. Pat. No. 4,013,935 a DC voltage transformer of the initially stated type is disclosed which is provided with a voltage comparator stage. The known DC voltage transformer is equipped with an oscillator stage provided with a switching transistor, wherein the collector-emitter voltage of the switching transistor is compared with a predeterminable reference signal by means of the voltage comparator stage.

SUMMARY OF THE INVENTION

It is an object of the present invention to provide a DC voltage transformer which is especially useful in automotive applications.

It is an object of the present invention to provide a DC voltage transformer, and in particular, such a transformer for use in motor vehicles in the event of reduced supply voltage.

The above and other objects of the invention are achieved by a DC voltage transformer having an inductance fed by a primary voltage and an oscillator stage switching the inductance for the generation of a secondary voltage, the oscillating stage generating an oscillating current flowing through the inductance and further comprising means for detecting the oscillating current and for automatically limiting the oscillating current to a presettable value.

The DC voltage transformer according to the invention has the advantage that a current regulation takes place, which means at too high an oscillating current it is limited to a given value. This ensures that no overloading of the structural parts of the oscillator stage occurs and that the inductance is not driven into saturation. Therewith the DC voltage transformer according to the invention is simultaneously insensitive to excess voltages which can occur in particular in onboard supply systems in motor vehicles. Through the current limitation according to the invention the inductance stores, independently of the magnitude of the available primary voltage, energies of equal magnitude.

According to a further development of the invention it is provided that the oscillating current is set via a control connection of a control element. The oscillating current is preferably detected by a sensor which influences the control connection of the control element.

An especially simple circuit configuration is achieved wherein the control element is a current limiting transistor via whose collector-emitter path the oscillating current flows and wherein the control connection is formed by the base of the current limiting transistor.

A resistor forming the sensor preferably is disposed in the collector-emitter current path of the current limiting transistor. This can form in particular simultaneously also the emitter resistance of the current limiting transistor so that the resistor fulfills a double function. Thus, the number of structural parts which must be used can be reduced.

According to a further development, a control stage driven by the sensor is provided which is connected to the base of the current limiting transistor. The magnitude of the control current detected by the sensor leads to an appropriate driving of the base of the current limiting transistor by means of the control stage to limit the oscillating current to the desired value.

For a particularly simple circuit configuration comprising only few structural parts it is further provided that the control stage has a control transistor whose collector-emitter path is connected to the base of the current limiting transistor and whose base is driven by the sensor.

Since the primary voltage is a DC voltage it must be chopped for the voltage transformer function. This is achieved by a system of the DC voltage transformer capable of oscillating. For the formation of this system the base of the control stage transistor is connected via a capacitor with the collector of the current limiting transistor.

The subject matter of the invention is preferably applied in the area of motor vehicle electronics, but it is, however, not limited to this field.

BRIEF DESCRIPTION OF THE DRAWINGS

The invention will be described in greater detail in the following detailed description with reference to the drawings, in which.

DETAILED DESCRIPTION

Figure 1:
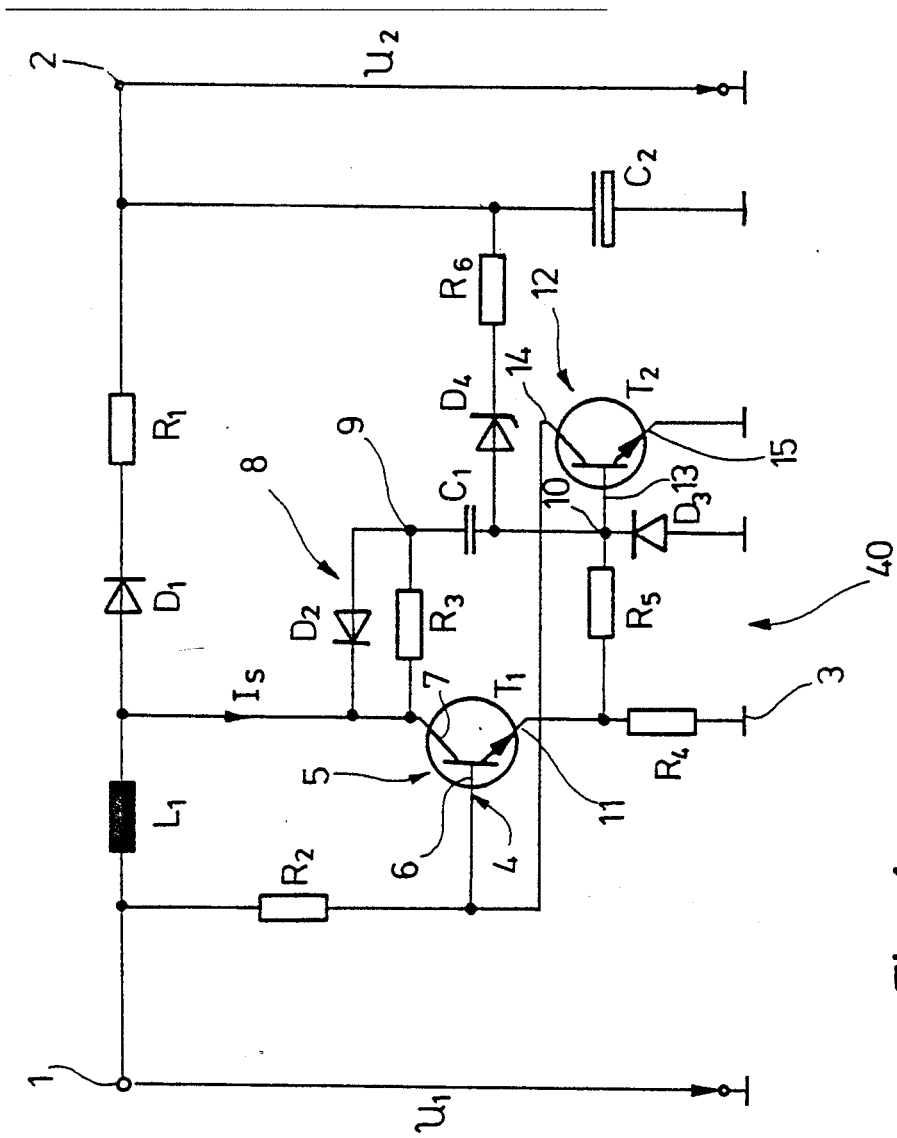
FIG. 1 shows a circuit diagram of a DC voltage transformer according to the invention for positive voltages.

FIG. 1 shows a circuit diagram of a first embodiment of the DC voltage transformer according to the invention. A primary voltage $U_1$ which represents the onboard supply system voltage available in the motor vehicle is connected to a terminal 1 which is connected with one connection of an inductance $L_1$. The other connection of the inductance $L_1$ leads to the anode of a diode $D_1$ whose cathode is connected with the one connection of a resistor $R_1$. The other connection of the resistor $R_1$ leads to a secondary-side terminal 2. At the terminal 2 a secondary voltage $U_2$ can be tapped. At the terminals 1 or 2 in each instance the positive pole of the primary or secondary voltage $U_1$, $U_2$, is formed while, in each instance, the negative pole is at ground 3.

With the terminal 1 further a first connection of a resistor $R_2$ is connected whose second connection leads to a control connection 4 of a control element 5. The control element 5 is preferably implemented as a current limiting transistor $T_1$. To this extent the base 6 of the current limiting transistor $T_1$ forms the control connection 4. The collector 7 of the current limiting transistor $T_1$ is connected to the connection between the inductance $L_1$ and the diode $D_1$. It is further connected with a parallel circuit 8 of a diode $D_2$ and a resistor $R_3$. The structural elements therein are arranged so that the cathode of the diode $D_2$ leads to the connection of the parallel circuit 8 connected to the collector 7. The other connection 9 of the parallel circuit 8 is connected with a capacitor $C_1$ which leads via a connecting point 10 to the cathode of a diode $D_3$ whose anode is at ground 3. The emitter 11 of the current limiting transistor $T_1$ is connected to a resistor $R_4$ whose further connection is likewise at ground 3. Further, a resistor $R_5$ is connected between the emitter 11 of the current limiting transistor $T_1$ and the connecting point 10.

Moreover, a control stage transistor $T_2$ of a control stage 12 is provided whose base 13 is connected to the connecting point 10. The collector 14 of the control stage transistor $T_2$ is connected with the base 6 of the current limiting transistor $T_1$. The emitter 15 of the control stage transistor $T_2$ is at ground 3.

The anode of a Zener diode $D_4$ is connected to the connecting point 10 and the associated cathode leads to a resistor $R_6$ whose other connection is applied to terminal 2. Between the terminal 2 and ground 3 is further connected a charging capacitor $C_2$.

The circuit configuration shown in FIG. 1 operates in the following way:

Between the terminal 1 and ground 3 the primary voltage $U_1$ is placed in such a way that the positive potential is at terminal 1 and the negative potential at ground 3. By applying the primary voltage $U_1$ the current limiting transistor $T_1$ is switched on based on the potential presetting through the resistor $R_2$. This means that its collector-emitter path becomes conducting so that an oscillating current $I_s$ driven by the primary voltage $U_1$ via the inductance $L_1$ flows through it. This oscillating current $I_s$ effects a magnetic energy build-up in the inductance $L_1$ and causes a corresponding voltage drop at the resistor $R_4$. This voltage drop at resistor $R_4$ causes the control stage transistor $T_2$ to shift into the conducting state via the resistor $R_5$. Since the collector 14 of the control stage transistor $T_2$ is connected with the base 6 of the current limiting transistor $T_1$, the through-connecting of the control stage transistor $T_2$ leads to a transition of the current limiting transistor $T_1$ into its blocking state. In particular, the control stage transistor $T_2$ thus causes a lowering of the base current of the current limiting transistor $T_1$. Thereupon the voltage increases at collector 7 of the current limiting transistor $T_1$ and fully drives the control stage transistor $T_2$ via the resistor $R_3$ and the capacitor $C_1$ in a regenerative feedback circuit. In this respect this effects an overall very rapid blocking of the current limiting transistor $T_1$.

The current driven by the inductance $L_1$ flows through diode $D_1$ and resistor $R_1$ into the charging capacitor $C_2$ at which the secondary voltage $U_2$ is available. The resistor $R_1$ serves for the suppression of oscillations between the inductance $L_1$ and the charging capacitor $C_2$. The series circuit formed of the resistor $R_3$ and the capacitor $C_1$ has a time constant chosen so that the current limiting transistor $T_1$ remains switched off until the current through the inductance $L_1$ has become zero. With the renewed switching-on of the current limiting transistor $T_1$ the capacitor $C_1$ is rapidly discharged across the diode $D_2$, the current limiting transistor $T_1$, the resistor $R_4$ and the diode $D_3$, wherein the control stage transistor $T_2$ is blocked due to a negative base bias voltage. The charge reversal of capacitor $C_1$ leads to a renewed blocking of the current limiting transistor $T_1$ as soon as a given current value is exceeded. The magnitude of this current value is determined by the choice of the resistance value of resistor $R_4$.

By means of the Zener diode $D_4$ and the resistor $R_6$ the secondary voltage $U_2$ available at the charging capacitor $C_2$ can be fixed. The secondary voltage $U_2$ can also be measured by means of an analog-to-digital converter and switched on or off through a positive signal at the base 13 of the control stage transistor $T_2$ of the voltage transformer.

From the above is evident that the DC voltage transformer according to the invention is current-regulated, that is, with too large an oscillating current $I_s$, the current $I_s$ regulated down to a lower value through appropriate driving of the current limiting transistor $T_1$. Hereby, on the one hand, the current limiting transistor $T_1$ is protected against overloading and, on the other hand, the inductance $L_1$ is not driven into saturation. There also is protection against voltage fluctuations of the primary voltage $U_1$ since an excess current superelevation cannot occur due to the current regulation according to the invention. Due to the particular simplicity of the DC voltage transformer circuit according to the invention, a cost-effective assembly is ensured. Furthermore, the voltage transformer according to the invention generates its oscillator frequency for chopping the primary voltage $U_1$ in its oscillator stage 40 itself, that is a special oscillator circuit is not required. The oscillating sets on already at very low primary voltages $U_1$, since the current limiting transistor $T_1$ is already switched on via the resistor $R_2$ at relatively low input voltages. Lastly, the DC voltage transformer according to the invention consequently operates in a very large input voltage range (primary voltage $U_1$) and is hence particularly suitable for use in a motor vehicle.

Figure 2:
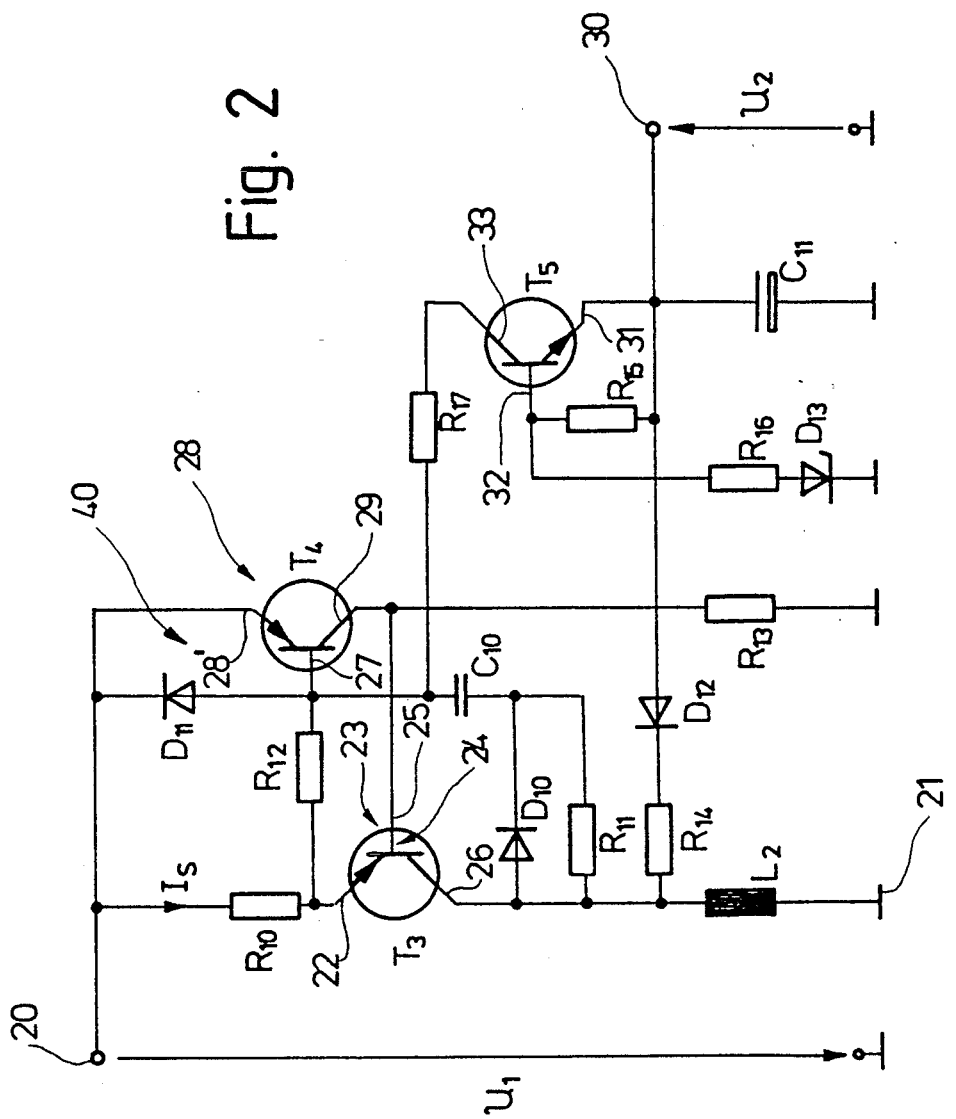
FIG. 2 shows a circuit diagram of a further embodiment for negative voltages.

In FIG. 2 a further embodiment is shown with which in simple manner negative voltages can be generated.

The primary voltage $U_1$ lies between a terminal 20 and ground 21. The terminal 20 is connected with a resistor $R_{10}$ whose other connection is connected to the emitter 22 of a current limiting transistor $T_3$. The current limiting transistor $T_3$ forms a control element 23 which has a control connection 24 formed by the base 25. The collector 26 of the current limiting transistor $T_3$ is connected to the one connection of an inductance $L_2$ whose other connection is at ground 21. One connection of a parallel circuit formed from a diode $D_{10}$ and a resistor $R_{11}$ is connected to the collector 26 of the current limiting transistor $T_3$. The other connection of the parallel circuit to which the cathode of diode $D_{10}$ leads is also connected to a capacitor $C_{10}$ whose second connection leads further to the base 27 of a control stage transistor $T_4$ of a control stage 28. The base 27 of the control stage transistor $T_4$ is connected with the emitter 22 of the current limiting transistor $T_3$ via a resistor $R_{12}$. Furthermore, the cathode of a diode $D_{11}$ whose anode is connected with the base 27 of the control stage transistor $T_4$ is connected to the terminal 20. The emitter 28' of the control stage transistor $T_4$ leads likewise to terminal 20. The base 25 of the current limiting transistor $T_3$ is connected to the collector 29 of the control stage transistor $T_4$ which further leads via a resistor $R_{13}$ to ground 21.

A resistor $R_{14}$ with which a diode $D_{12}$ is connected in series such that its cathode leads to resistor $R_{14}$ is connected to the interconnection between the collector 26 of the current limiting transistor $T_3$ with the inductance $L_2$. The anode of diode $D_{12}$ is connected to terminal 30 which has the secondary voltage $U_2$ relative to ground 21. The terminal 30 is further connected with the emitter 31 of a transistor $T_5$ whose base 32 leads via a resistor $R_{15}$ to terminal 30. The base 32 of the transistor $T_5$ is connected to the series circuit of a resistor $R_{16}$ and a Zener diode $D_{13}$ whose cathode is at ground 21. The collector 33 of transistor $T_5$ is connected via a resistor $R_{17}$ with the base 27 of the control stage transistor $T_4$. A charging capacitor $C_{11}$ is connected between the terminal 30 and ground 21.

In deviating from the embodiment according to FIG. 1 the setting of the secondary voltage $U_2$ is not carried out by a simple series circuit of a Zener diode and a resistor but rather by means of the transistor $T_5$ wherein the voltage presetting takes place through driving its base 32.

The function of the circuit represented in FIG. 2 corresponds otherwise to that of FIG. 1 so that it does not need to be explained here in greater detail.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A DC voltage converter comprising a pair of input terminals and a pair of output terminals, an inductance coupled to one of said input terminals, the input terminals being coupled to a source of primary DC voltage provided across the input terminals, and further comprising an oscillator stage coupled to said inductance, said oscillator stage switching the inductance, an oscillating current flowing through the inductance so as to generate a secondary voltage across a charge storage element, the charge storage element coupled to the inductance and across the output terminals, the oscillator stage comprising a current limiting switch having a current sensor connected in series therewith, the current limiting switch having two main terminals and a control terminal, and further comprising a control switch, the control switch having two main terminals and a control terminal, said current limiting switch comprising a first semiconductor switch, a main terminal of said first semiconductor switch being coupled to said inductance, the control terminal of said current limiting switch being coupled through a resistor to an opposite terminal of the inductance, the other main terminal of the current limiting switch being coupled to a resistor comprising said current sensor, said control switch comprising a second semiconductor switch, one of said main terminals of the control switch being coupled to the control terminal of said first semiconductor switch and the other of said main terminals being coupled to one of the input terminals, said current sensor also being coupled to one of said input terminals, the control terminal of said second semiconductor switch being coupled to said current sensor, a diode being coupled to the control terminal of the second semiconductor switch such that the diode is reversed biased by said source of primary DC voltage, one of said main terminals of said first semiconductor switch being coupled to the control terminal of said second semiconductor switch through a resistor and a capacitor connected in series with a diode being connected across said latter resistor, said diode being reversed biased by said source of primary DC voltage, a threshold device being coupled in series with a further resistor, said series combination of said threshold device and said further resistor being coupled between said control terminal of said second semiconductor switch and said charge storage element, said charge storage element being coupled to said inductance via a resistor and a rectifier diode.

2. The DC voltage converter recited in claim 1, wherein the first semiconductor switch comprises a current limiting transistor having a collector-emitter path through which the oscillating current flows and the control terminal of the current limiting transistor comprises a base electrode, said sensor being connected in series with said collector-emitter path.

3. The DC voltage converter recited in claim 2, wherein the current sensor comprises a resistor coupled to the emitter of the current limiting transistor.

4. The DC voltage converter recited in claim 2, wherein the control switch comprises a transistor having a collector-emitter path and the control terminal of the control transistor comprises a base electrode, the collector-emitter path of the control switch being coupled to the base electrode of the current limiting transistor.

* * * * *

UNITED STATES PATENT AND TRADEMARK OFFICE
CERTIFICATE OF CORRECTION

PATENT NO. : 4,999,566

DATED : March 12, 1991

INVENTOR(S) : Willi Kuehn

It is certified that error appears in the above-identified patent and that said Letters Patent is hereby corrected as shown below:

On the title page and col. 1, lines 1-5 change [54] to read

--DC CURRENT CONVERTER COMPRISING CURRENT RESPONSIVE SELF OSCILLATING SWITCHING REGULATOR--

Signed and Sealed this

Seventeenth Day of November, 1992

*Attest:*

DOUGLAS B. COMER

*Attesting Officer*  *Acting Commissioner of Patents and Trademarks*